United States Patent [19]

Feig et al.

[11] Patent Number: 5,523,847
[45] Date of Patent: Jun. 4, 1996

[54] DIGITAL IMAGE PROCESSOR FOR COLOR IMAGE COMPRESSION

[75] Inventors: Ephraim Feig, Briarcliff Manor; Elliot N. Linzer, Bronx, both of N.Y.

[73] Assignee: International Business Machines Corporation, Armonk, N.Y.

[21] Appl. No.: 958,998

[22] Filed: Oct. 9, 1992

[51] Int. Cl.$^6$ .................................................. G06F 17/10
[52] U.S. Cl. .................... 358/261.3; 395/114; 382/250; 382/280
[58] Field of Search ................................. 358/401, 426, 358/261.1, 261.3, 427, 432, 433; 348/15, 384, 642, 659, 660; 395/114, 200; 382/162, 166, 232, 248, 250, 276, 280

[56] References Cited

U.S. PATENT DOCUMENTS

| | | |
|---|---|---|
| 3,920,974 | 11/1975 | Means . |
| 3,971,927 | 7/1976 | Speiser et al. . |
| 4,152,772 | 5/1979 | Speiser et al. . |
| 4,196,448 | 4/1980 | Whitehouse et al. . |
| 4,385,363 | 5/1983 | Widergren et al. . |
| 4,675,836 | 6/1987 | Arnould et al. . |
| 4,679,163 | 7/1987 | Arnould et al. . |
| 4,791,598 | 12/1988 | Liou et al. . |
| 4,797,847 | 1/1989 | Duhamel . |
| 4,805,017 | 2/1989 | Kaneko et al. . |
| 4,829,465 | 5/1989 | Knauer et al. . |
| 4,841,464 | 6/1989 | Guichard et al. . |
| 4,974,078 | 11/1990 | Tsai . |
| 5,001,559 | 3/1991 | Gonzales et al. . |
| 5,021,891 | 6/1991 | Lee . |
| 5,029,122 | 7/1991 | Uetani . |
| 5,212,742 | 5/1993 | Normile et al. . |
| 5,253,078 | 10/1993 | Balkanski et al. ...................... 358/426 |
| 5,321,725 | 6/1994 | Paik et al. .................... 375/39 |
| 5,333,212 | 7/1994 | Ligtenberg . |

*Primary Examiner*—Bentsu Ro
*Attorney, Agent, or Firm*—Blaney Harper; Daniel P. Morris

[57] ABSTRACT

The objects of this invention are accomplished by rearranging the DCT process such that non-trivial multiplications are combined in a single process step. In particular, the DCT equations for the application of the two-dimensional DCT process on k×k points are factored into 1) a permutation matrix, 2) a diagonal matrix, and 3) a matrix whose product with an arbitrary vector having $k^2$ points requires considerably fewer non-trivial multiplications. Furthermore, in some cases none of these non-trivial multiplications are nested; that is, no output of a non-trivial multiplication is ever involved in another multiplication operation. The diagonal matrix is not unique for any set of data. Once the diagonal matrix elements are chosen the remaining factors are developed. When the factorization is complete, the diagonal matrix is absorbed into the quantization step which follows the DCT process. The quantization step is the multiplication of a diagonal matrix by the DCT output data. The quantization diagonal matrix is combined with the diagonal matrix of the DCT to form one multiplication process by which non-trivial elements multiply data. This combination of multiplication steps reduces the number of non-trivial multiplications in the DCT process. In addition, the non-trivial multiplications are approximated by multiplications by rational numbers, whose computation is achieved with additions, subtractions and shift operations (multiplications by powers of 2). This approximation procedure offers greater numerical accuracy than a procedure based upon approximating the multiplication factors of a standard DCT process with rational factors because the number of non-trivial multiplications have been minimized and none are nested. Furthermore, if the quantization constants are chosen so that they are all either powers of 2 or sums and differences of powers of 2, then the quantization process itself can be achieved with either shifts only or with shifts and additions and subtractions only. Finally, the same reduction in non-trivial multiplications is provided for the inverse DCT and dequantization process.

32 Claims, 3 Drawing Sheets

DIGITAL IMAGE PROCESSOR FOR COLOR IMAGE COMPRESSION

FIELD OF THE INVENTION

This invention relates generally to the field of image processing. In particular, this invention relates to methods and apparatus for digitally representing images and transmitting digital representations of images. More specifically, this invention relates to a method and apparatus for performing forward and inverse Discrete Cosine Transforms of digital images.

BACKGROUND OF THE INVENTION

The display and transmission of visual images is increasingly important for modern communications. In particular, it is important for modern computer driven displays to receive, transmit, and display sequences of images in rapid succession such as is shown in movies. The quality of the visual display can be improved by representing the visual images in a digital format. Generally, a visual image can be represented by dividing the image into sufficiently small picture elements, called pixels, and assigning to each pixel a color and a value representing the intensity of the color for the pixel. For example, a typical 8 inch by 10 inch visual image may be divided into a two dimensional array of 768 by 1024 pixels wherein each pixel is further divided into 3 subpixels. The three subpixels are each associated with one of the three primary colors red, green, or blue. Each subpixel is assigned a digital value corresponding to the intensity level for the color the subpixel. The subpixels are small enough such that the human eye does not resolve each subpixel. Rather, the image presented by a pixel to the viewer is some combination of the three colors associated with each subpixel weighted by the intensity value for each subpixel color. As a result, a visual image is represented by three two dimensional matrices of color intensity values. This representation is commonly referred to as RGB (Red Green Blue) data for images.

The digital image represents a high quality image because the pixels are small. However, as the pixel gets smaller, there are more pixels for the same size image and more intensity values to store, manipulate, and transmit. The fact that more pixels requires more data also results in a reduction in the ability to transmit images because the amount of data for each image transmitted is so large. As a result, various efforts have been made to transform this RGB data into another form of data which can be transmitted and stored efficiently and which can also be re-transformed back into RGB data for display. The new form of data most often chosen relates the RGB data to a luminance value and two chrominance values. In particular, the luminance value represents the intensity of a pixel on a grey scale which provides an accurate representation of the image to a monochrome display. The luminance value is obtained by weighting each intensity value of the RGB data and combining them. For example, the National Television Systems Committee (NTSC) standard luminance value $Y=0.299R+0.587G+0.114B$, wherein R is the red intensity value, G is the green intensity value, and B is the blue intensity value. The two chrominance values convey information which describes how the colors differ from monochrome. For example, the NTSC values are $U=Y-B$ and $V=Y-R$. The luminance and chrominance representation of image data is referred to as YUV data. The RGB to YUV transform compacts most of the visual intensity information into the luminance variable. This effect is similar to viewing a color image on a monochrome monitor in that the viewer understands a significant portion of the image but does not understand it all. This effect is useful for reducing the amount of data representing the image because the YUV data can be digitally filtered and coded such that much of the chrominance data, and some of the luminance data, can be discarded and replaced with code values which can be stored and transmitted more efficiently. There are a variety of techniques for performing the YUV filtering process, the most common of which is a Discrete Cosine Transform (DCT). The DCT replaces local blocks of YUV pixel data (such as 6×6 pixels or 8×8 pixels) with data generated from the YUV to DCT conversion performed on the YUV data. The resulting DCT data is very compact and can be easily stored or transmitted. The RGB to YUV and YUV to DCT conversions are largely, but not exactly invertible, so that the compact DCT data can be re-converted back into a very accurate representation of the digitized image even though the re-converted data is not exactly the same as the original digital image data.

The basic problem with this image conversion process is that even though digital data can be conveniently compacted, through the YUV and DCT conversions, each conversion requires several multiplications, additions and/or subtractions. This is a problem because each multiplication, addition or subtraction requires time for a computer processor to implement. Processing multiple operations for each pixel and processing thousands of pixels per image requires a significant amount of processor time. This amount of processor time is typically large enough to degrade the rate at which sequential images can be displayed. Degrading the display rate degrades the ability to display objects in motion. As a result, either the speed at which the processor multiplies must be increased or the conversion process must be changed to require fewer multiplication steps in order to implement high quality motion displays. One prior art attempt at increasing the speed of the multiplications is to replace the multiplication operations with look up tables. Look up tables may reduce the time required for multiplication operations which often are much slower than additions or subtractions because multiplications in the binary number system are typically a series of bit shift and add operations so that the time for each multiplication is a multiple of an add operation. Also, look-up tables are convenient to implement whereas special purpose multiplication hardware is much more complex than special purpose fixed point addition, subtraction and shift hardware. However, even though a look up table decreases the number of multiplication operations, the table itself is typically not very fast. Moreover, many computer processors are very efficient in using time between multiplications when performing many multiplications because of the pipelined structure of the processor. When look up tables are used in conjunction with computer processors, the pipelined structure can be disrupted and the overall efficiency of image processing is decreased even though the individual look up table operation is faster than the multiplication operation. Therefore, look up tables have not been very successful in increasing the speed of the image processing.

Beyond improving the speed of the multiplication operation, the prior art has also attempted to reduce the number of non-trivial multiplication steps required in the DCT conversions. A non-trivial multiplication is multiplication by a factor other than two. Multiplication by a factor of two is a shift operation in the binary system. Non-trivial multiplications have been reduced in the prior art by recognizing that the DCT equations contain a fixed constant which can be factored from the DCT equations and combined with another procedure in the DCT process. The problem with this technique is that although there is a reduction in the number of multiplication steps, the reduction is small. In particular, the common factor removed generally multiplies another non-trivial factor which does not reduce the number of multiplication processes.

OBJECTS OF THE INVENTION

It is another object of the present invention to manufacture an improved digital image processor.

It is a further object of the present invention to manufacture a faster digital image processor.

It is still another object of the present invention to manufacture a digital image processor having fewer non-trivial multiplication operations.

It is still a further object of the present invention to manufacture a digital image processor having an improved forward DCT operation.

It is still another object of the present invention to manufacture a digital image processor having an improved inverse DCT.

It is still a further object of the present invention to manufacture a digital image processor having an improved forward DCT which does not utilize any non-trivial multiplication processes.

It is still another object of the present invention to manufacture a digital image processor having an improved inverse DCT which does not utilize any non-trivial multiplication processes.

SUMMARY OF THE INVENTION

The objects of this invention are accomplished by rearranging the DCT process such that non-trivial multiplications are combined in a single process step. In particular, the DCT equations for the application of the two-dimensional DCT process on k×k points are factored into 1) a permutation matrix, 2) a diagonal matrix, and 3) a matrix whose product with an arbitrary vector having $k^2$ points requires considerably fewer non-trivial multiplications. In addition, where non-trivial multiplications are required, those multiplications are generally not nested. That is, no output of a non-trivial multiplication is involved in another multiplication operation. The diagonal matrix is not unique for any set of data. Once the diagonal matrix elements are chosen the remaining factors are developed. When the factorization is complete, the diagonal matrix is absorbed into the quantization step which follows the DCT process. The quantization step is the multiplication of a diagonal matrix by the DCT output data. The quantization diagonal matrix is combined with the diagonal matrix of the DCT to form one multiplication process by which non-trivial elements multiply data. This combination of multiplication steps reduces the number of non-trivial multiplications in the DCT process. In addition, the non-trivial multiplications are approximated by multiplications by rational numbers, whose computation is achieved with additions, subtractions and shift operations (multiplications by powers of 2). This approximation procedure offers greater numerical accuracy than a procedure based upon approximating the multiplication factors of a standard DCT process with rational factors because the number of non-trivial multiplications have been minimized and none are nested. Furthermore, if the quantization constants are chosen so that they are all either powers of 2 or sums and differences of powers of 2, then the quantization process itself can be achieved with either shifts only or with shifts and additions and subtractions only. Finally, the same reduction in non-trivial multiplications is provided for the inverse DCT and dequantization processes.

DESCRIPTION OF THE PREFERRED EMBODIMENT

Figure 1:
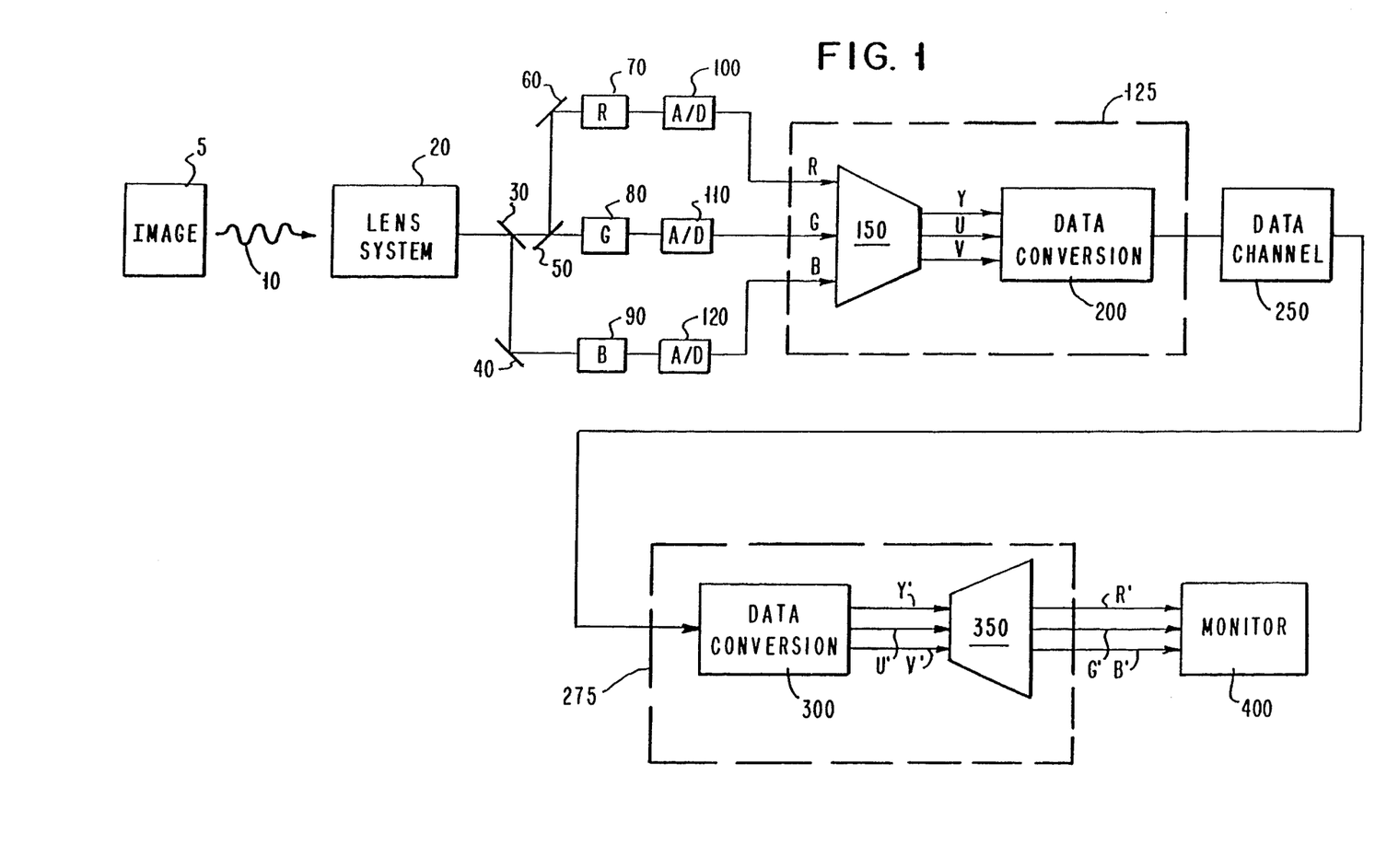
FIG. 1 illustrates one embodiment of a digital image processing system according to the present invention.

FIG. 1 illustrates one embodiment of an apparatus for the formation, transmission, and presentation of a digital image according to the present invention. Source light 10 from an image subject 5 is transmitted by a lens system 20 to a light beam mirror system. The lens system 20 generally consists of an objective lens and a condenser lens for forming the real image and a relay lens for transmitting the real image to the mirror system. The mirror system consists of a blue reflecting dichroic mirror 30 which transits blue light to sensor means 90 by mirror 40. Similarly, the mirror system uses a red reflecting dichoric mirror 50 to transmit red light to sensor means 70 by mirror 60. The remaining green light is passed directly through the mirror system to sensor 80. Each of the sensor means is a two dimensional array of light sensitive elements in which each element senses an intensity level of the light and converts that intensity level into an analog electrical signal. Each element in the red sensor array has a corresponding element in the green and blue sensor arrays so that the addition of red, green, and blue colors having the intensity level for a particular element results in the composite light signal produced by lens system 20 for that particular element. The output of each element in the two dimensional array of sensor elements is sent to an analog to digital (A/D) converter. The analog signals produced by red sensor means 70 is sent to A/D converter 100, the output of green sensor means 80 is sent to A/D converter 110, and the output of blue sensor means 90 is sent to A/D converter 120. The A/D converters convert the analog signals into a two dimensional matrix of digital value representing the intensity of light for each element in the red, green, and blue sensors. The accuracy of the A/D converters in this embodiment is 8 bits but this accuracy could be a variety of values such as 4, 6, or 10 bits. The A/D converters create data for one two dimensional matrix having one value of a given accuracy for each element in the matrix for each of the three colors red, green, and blue. The creation of the matrices of digital values representing the color sensor outputs, called RGB data, can be created in a variety of conventional methods other than described above. For example, scanning means or artificial creation of the color data generated by conventional computers are typical methods of generating the RGB data. All of these methods have in common the fact that the RGB data is a representation of a physical measurement of light intensity for each element of the two dimensional array of color sensor elements.

Once the RGB data has been created, the data is transformed and coded. In particular, the RGB data is transformed into YUV data in which the Y value represents the luminance value of the composite RGB data for a single element in the two dimensional array in the corresponding red, green, and blue sensors. Also, the U and V values represent the (Y–blue) and (Y–red) values, respectively, of the composite RGB data for a single element in this two dimensional array. The three two dimensional matrices containing digital RGB data are converted into three two dimensional matrices in which one matrix has Y data, one matrix has U data, and one matrix has V data. The RGB data is transformed into YUV data by transform means 150 because YUV data can be coded for transmission more efficiently than RGB data. In particular, RGB data transformed into YUV data is sent to data conversion means 200 which selectively filters the data, quantizes the filtered data, and encodes the quantized filtered data for transmission. The selective filtration of the YUV data is accomplished through a filter means such as a discrete cosine transform (DCT). The DCT selectively reduces the amount of YUV data required to create an image. The RGB to YUV transform compacted a substantial amount of visual information into the luminance variable for each element of the two dimensional array so that much of the U and V data is not required to recreate the visual image. The DCT filter systematically removes and combines YUV data which is not required to accurately reproduce the image.

After the YUV data has been filtered through the DCT, it is then quantized. The quantization normalizes the filtered YUV data and then rounds the normalized data off to the nearest binary integer. This step is required because it is more efficient to transmit a large volume of data having a normalized distribution rather than a large volume of random data. The quantization process contains a multiplication step in which each filtered vector of YUV data is multiplied by a constant which normalizes the YUV data. Finally, the normalized data is encoded for digital transmission by a process such as a Huffman coding process and then the coded data is converted into electrical or optical signals which are transmitted over a data channel 250. The Huffman (or similar) coding procedure compresses the quantized YUV data into a serial bit stream which can be conveniently transmitted. Conventional electrical conversion devices convert the serial bit stream into electrical signals which are then applied to electrical transmission wires for carrying the electrical signals. The code to signal conversional devices could also be optical or electromagnetic devices which transform the serial bit stream into optical or electromagnetic signals which would then be applied to the optical media (such as fiber optic cables) or electromagnetic media (such as the atmosphere).

Data channel 250 comprises a transmitter, receiver, and interconnection media. The interconnection media can be electrical or optical, or can be merely atmospheric in the case of satellite transmission. Conventional data transmitters transmit data through the interconnection media to a conventional data receiver which sends the data to a decoding unit. The DCT filter, normalization, and encoding processes associated with the data conversion means 200 are reversible through the data conversion means 300. The data conversion means 300 decodes the encoded data, dequantizes it, and performs an inverse DCT (IDCT) on the decoded data. The IDCT generates Y'U'V' data which is similar to but not the same as the YUV data which started the process. The Huffman coding, normalization, and the DCT processes of data conversion means 200 can be inverted, however, the quantization process cannot be completely reversed. The quantization process cannot be completely reversed because once part of the data is truncated, that truncated part cannot be recovered. Therefore, when the inverse DCT (IDCT) is performed on the de-coded and dequantized Huffman code, the resulting Y'U'V' data is not the same as the YUV data which started the process. After the Y'U'V' data has been generated it is sent to a Y'U'V' to R'G'B' transform means 350. Transform means 350 converts the Y'U'V' data into R'G'B' data which is then sent to a display monitor. The display monitor 400 reproduces images from the R'G'B' data. The reproduced images are perceived by a viewer as essentially identical to the original images which generated the RGB data even though the RGB and R'G'B' data are different.

The transform means 150 and data conversion means 200 form processor 125. The data conversion means 300 and inverse transform means 350 form inverse processor 275. A central element to both the processor and inverse processor is the RGB to YUV transform and inverse transform operation. Specifically, the transform means converts RGB data to YUV data according to the following function: $Y=0.299R+0.587G+0.114B$ and $U=Y-B$ and $V=Y-R$.

Figure 2:
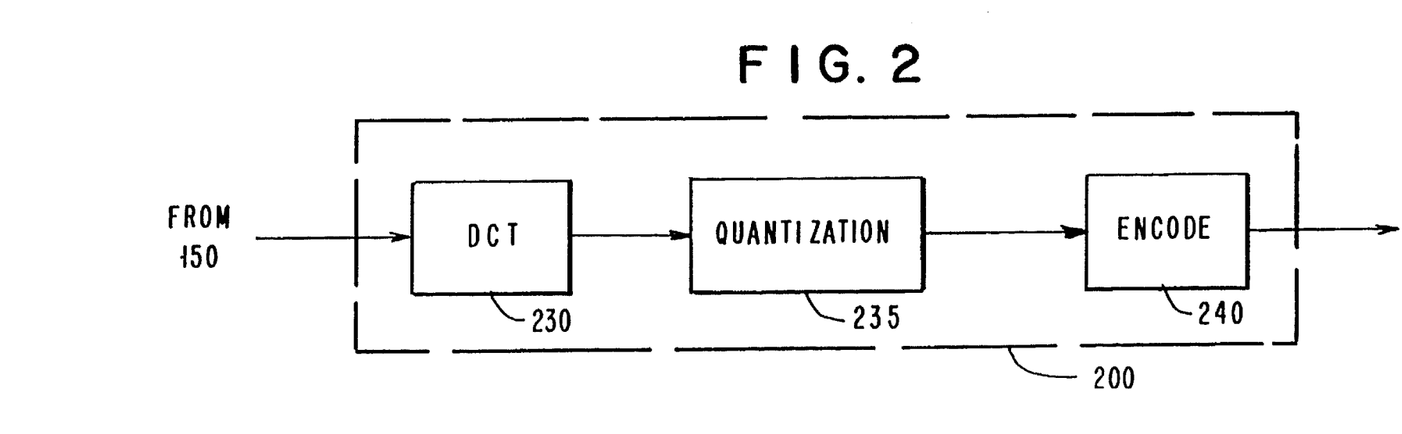
FIG. 2 illustrates one embodiment of a data conversion means according to the present invention.

Once all the RGB data has been converted to YUV data, the YUV data for each pixel is sent to data conversion means 200. FIG. 2 illustrates that the data conversion means 200 filters, quantizes, and codes the data for transmission. The filter process 230 is a Discrete Cosine Transform (DCT) process in which pixel groups of YUV data are transformed into DCT data through the DCT transform. The DCT transform function weights the Y, U, and V data such that only the data to which the human eye is sensitive is retained. In particular, each of the Y, U, and V matrices of pixel values are divided up into groups of pixels having k×k elements such as 6×6, 8×8, 12×12, etc. The data within each group of pixels for each matrix is replaced by DCT transform data. For example, if X (having elements x(i,j) represents the data within each of the 64 pixels (for an 8×8 pixel grouping) in each of the Y, U, and V matrices, then the resulting DCT data $\Gamma_y=AX_yA'$ wherein the DCT transform matrix A has elements $a(i,j)=c_i \cos[\pi i(2j+1)/16]$ for i,j=0,1,2, . . . 7 and where $c_0=1/\sqrt{8}$ and $c_i=¼$ when i>0. Similarly, $\Gamma_u=AX_uA'$ and $\Gamma_v=AX_vA'$. The DCT transform is repeated for each group of 64 pixels in each 8×8 matrix of Y, U, and V data.

The general DCT transform procedure can be implemented in a variety of embodiments. One embodiment of the DCT transform means is a combination of a multiplier and memory which implements a two stage multiplication process. Specifically, the first stage multiplies the columns of X by A and stores the results in a temporary memory. That is, the transform matrix A is applied to a series of 1-dimensional vectors having k elements. The results of this operation are stored to create the product matrix AX. The rows of this resulting matrix are also 1-dimensional vectors of data, each of which are multiplied by A' in the second stage to create the final product Γ. This specific procedure is called the row-column method for implementing the DCT. This DCT procedure can also be carried out in a variety of different devices such as look-up tables, special purpose multipliers, ALUs, or other devices suitable for manipulating digital data.

The conventional row-column procedure for implementing the DCT transform function multiplies a series of 1-dimensional data vectors having k elements by the transform matrix A. This procedure requires requires $2k^3$ multiplications and $2k^2(k-1)$ additions/subtractions for a k×k matrix of input data X when the transform matrix is explicitly multiplied by the data vectors. This number of multiplications is excessively large. A first embodiment of the present invention substantially decreases the number of non-trivial multiplications in the DCT procedure because the transform matrix A is factored in a specific manner which decreases the number of non-trivial multiplications. In particular, A is factored into a diagonal factor and a scaled factor such that the diagonal factor can be absorbed into a later quantization step and the scaled factor can be multiplied by the data vector with a minimum of non-trivial multiplications. The 1-dimensional DCT transform matrix on k points, $A_k$, is initially scaled as:

$$E_k \tilde{F}_k = A_k, \tag{1}$$

where $E_k$ is a diagonal matrix $$E_k = \sqrt{1/k} \; \text{Diag}(1, \sqrt{2}, \ldots, \sqrt{2}) \tag{2}$$

whose entries are the constants $c_i$ of the DCT transform, and $\tilde{F}_k$ is the remaining factor. The number of points, k, is generally 8, so that $A_k$ is typically 8×8, but k can also be 6, 12, or another number.

The transform matrix $\tilde{F}_k$ is further scaled so that not only the constants of the DCT $c_i$ are factored out but factors which cause non-trivial multiplications are also removed. In particular, equation (1) is re-written as:

$$D_k F_k = A_k, \tag{3}$$

where $$E_k^{-1} D_k F_k = \tilde{F}_k, \tag{4}$$

and where $D_k$ is a secondary factor which is a k×k diagonal matrix that factors out as many non-trivial multiplications (other than the constants $c_i$ which are factored out by $E_k$) as possible using a k×k diagonal matrix. One particular choice of $D_k$ is the k×k diagonal matrix in which each jj-th element is the first element in the j-th row of $A_k$ where 1<j<k; other choices are possible. This process results in the matrix $F_k$ which is to be multiplied by the YUV data subsets and for which computing its product by the YUV data subsets requires considerably fewer non-trivial multiplications than $A_k$. $D_k$ is later absorbed into the quantization process in a similar manner to $E_k$ which is further explained below. The use of this factorization process reduces the number of non-trivial multiplications in $F_k$ to 1 for a 6 point DCT process, to 5 for an 8 point DCT process, and to 6 for a 12 point DCT process.

In a second embodiment of the present invention, the DCT procedure is implemented by performing the addition stages in row-column fashion and performing the multiplication stages on columns only by applying various efficient linear transformations to the various columns. As will be seen in the following paragraphs, the matrices $A_k$ are factorable as products of spare matrices. Some of the sparse matrices are called addition matrices and whose product with vectors require only additions and/or subtractions, and some of the sparse matrices are called multiplication matrices whose product with vectors require multiplications and perhaps some additions and/or subtractions. In particular, columns of X are multiplied by $F_k$ where $A_k = D_k F_k$ and where $D_k$ is a diagonal matrix which factors as many non-trivial multiplications as possible from $A_k$. A general factorization technique for matrices $A_k$ is explained in "On Computing the Discrete Fourier Transform", by S. Winograd, Mathematics of Computations, vol. 32, no. 141, pages 175–199 (1978) which is hereby incorporated by reference, and in U.S. patent application Ser. No. 403,631, filed Sep. 6, 1989, entitled "Multidimensional Array Processor and Array Processing Method", assigned to the same assignee as the present application and which is also hereby incorporated by reference. The general factorization technique subdivides $F_k$ into a permutation matrix, a multiplicative core, and one or more addition matrices. A permutation matrix P is a matrix such that $P(A \otimes B)P^{-1} B \otimes A$ for all A and B. In order to more fully understand this procedure, explicit factorizations for various matrices $A_k$ are now provided. In particular, explicit factorizations for the transform matrices $A_2$, $A_3$, $A_4$, $A_6$, $A_8$ and $A_{12}$ are provided for illustration purposes. These factorizations depend on the choices of quantities for the corresponding $D_k$ matrices, and as a result the factorizations are not unique. Nevertheless, the other similar factorizations will provide transform multiplications which have the same minimum number of non-trivial multiplications as the factorizations illustrated here. Furthermore, it should be clear that if a factorization X=AB is given, then for any nonsingular matrix C of appropriate dimensions, $X=(AC)(C^{-1}B)$ is again a factorization, and if C is a permutation or signed-permutation, then the two factorizations are equivalent.

The ensuing factorizations use the following notation: $\alpha_1 = \sqrt{3}/3$, $\alpha_2 = \sqrt{6}/6$ and $\gamma_j = \cos(\pi j/16)$ Also, $\otimes$ will denote the tensor product of matrices. Thus, if A is a $m_1 \times m_2$ matrix with (i,j)-th entry $\alpha_{ij}$ and and B is a $n_1 \times n_2$ matrix, then $A \otimes B$ is the $m_1 n_1 \times m_2 n_2$ matrix with block entries $\alpha_{ij} B$. Also, if v is a k-dimensional vector, then the matrix Diag(v) is the k×k diagonal matrix whose diagonal entries are, in order from top left to bottom right, the ordered entries in v. The factorizations for $A_k$ are:

$$A_2 = D_2 F_2, \tag{5}$$
where
$$D_2 = \text{Diag}(\gamma_4, \gamma_4)$$
and
$$F_2 = \begin{pmatrix} 1 & 1 \\ 1 & -1 \end{pmatrix}.$$

$$A_3 = D_3 F_3, \tag{6}$$
where
$$D_3 = \text{Diag}(\alpha_1, \gamma_4, \alpha_2)$$
and
$$F_3 = \begin{pmatrix} 1 & 1 & 1 \\ 1 & 0 & -1 \\ 1 & -2 & 1 \end{pmatrix}.$$

$$A_4 = D_4 F_4, \tag{7}$$
with
$$F_4 = B_3 B_2 B_1 B_0,$$
and $$B_0 = \begin{pmatrix} 1 & 0 & 0 & 1 \\ 0 & 1 & 1 & 0 \\ 1 & 0 & 0 & -1 \\ 0 & 1 & -1 & 0 \end{pmatrix},$$

$$B_1 = \begin{pmatrix} 1 & 1 & 0 & 0 \\ 1 & -1 & 0 & 0 \\ 0 & 0 & 1 & 0 \\ 0 & 0 & 1 & 1 \end{pmatrix},$$

-continued $$B_2 = \begin{pmatrix} 1 & 0 & 0 & 0 \\ 0 & 1 & 0 & 0 \\ 0 & 0 & 1 & 0 \\ 0 & 0 & 0 & \gamma_4 \end{pmatrix},$$

$$B_3 = \begin{pmatrix} 1 & 0 & 0 & 0 \\ 0 & 0 & 1 & 1 \\ 0 & 1 & 0 & 0 \\ 0 & 0 & 1 & -1 \end{pmatrix},$$

$$D_4 = \begin{pmatrix} 1/2 & 0 & 0 & 0 \\ 0 & \gamma_6 & 0 & 0 \\ 0 & 0 & 1/2 & 0 \\ 0 & 0 & 0 & \gamma_2 \end{pmatrix}.$$

The explicit factorization of $A_6$ is $$A_6 = D_6 F_6, \qquad (8)$$

where $$F_6 = R_6 T_6 S_6 P_6$$

with $S_6 = \Phi_1 \Phi_2$, and wherein $$P_6 = \begin{pmatrix} 1 & 0 & 0 & 0 & 0 & 0 \\ 0 & 0 & 0 & 0 & 1 & 0 \\ 0 & 0 & 0 & 0 & 0 & 1 \\ 0 & 0 & 1 & 0 & 0 & 0 \\ 0 & 1 & 0 & 0 & 1 & 0 \\ 0 & 0 & 0 & 1 & 0 & 0 \end{pmatrix},$$

$$\Phi_2 = \begin{pmatrix} 1 & 1 & 1 & 0 & 0 & 0 \\ 1 & 0 & -1 & 0 & 0 & 0 \\ 1 & -2 & 1 & 0 & 0 & 0 \\ 0 & 0 & 0 & 1 & 1 & 1 \\ 0 & 0 & 0 & 1 & 0 & -1 \\ 0 & 0 & 0 & 1 & -2 & 1 \end{pmatrix},$$

$$\Phi_1 = \begin{pmatrix} 1 & 0 & 0 & 1 & 0 & 0 \\ 0 & 1 & 0 & 0 & 1 & 0 \\ 0 & 0 & 1 & 0 & 0 & 1 \\ 1 & 0 & 0 & -1 & 0 & 0 \\ 0 & 1 & 0 & 0 & -1 & 0 \\ 0 & 0 & 1 & 0 & 0 & -1 \end{pmatrix},$$

$$T_6 = \text{Diag}(1, 1, 1, 1, \sqrt{3}, 1),$$

$$R_6 = \begin{pmatrix} 1 & 0 & 0 & 0 & 0 & 0 \\ 0 & 0 & 0 & 0 & 1 & 1 \\ 0 & 1 & 0 & 0 & 0 & 0 \\ 0 & 0 & 0 & 1 & 0 & 0 \\ 0 & 0 & 1 & 0 & 0 & 0 \\ 0 & 0 & 0 & 0 & 1 & -1 \end{pmatrix},$$

and $$D_6 = \text{Diag}(\alpha_2, \alpha_2/2, \frac{1}{2}, \alpha_2, \alpha_1/2, \alpha_2/2),$$

$$A_8 = D_8 F_8, \qquad (9)$$

where $$F_8 = R_8 T_8 S_8$$

with $S_8 = X_3 X_2 X_1$, and wherein $$X_1 = \begin{pmatrix} 1 & 0 & 0 & 0 & 0 & 0 & 0 & 1 \\ 0 & 1 & 0 & 0 & 0 & 0 & 1 & 0 \\ 0 & 0 & 1 & 0 & 0 & 1 & 0 & 0 \\ 0 & 0 & 0 & 1 & 1 & 0 & 0 & 0 \\ 0 & 0 & 0 & 1 & -1 & 0 & 0 & 0 \\ 0 & 0 & 1 & 0 & 0 & -1 & 0 & 0 \\ 0 & 1 & 0 & 0 & 0 & 0 & -1 & 0 \\ 1 & 0 & 0 & 0 & 0 & 0 & 0 & -1 \end{pmatrix},$$

$$X_2 = \begin{pmatrix} 1 & 0 & 0 & 1 & 0 & 0 & 0 & 0 \\ 0 & 1 & 1 & 0 & 0 & 0 & 0 & 0 \\ 0 & 1 & -1 & 0 & 0 & 0 & 0 & 0 \\ 1 & 0 & 0 & -1 & 0 & 0 & 0 & 0 \\ 0 & 0 & 0 & 0 & -1 & 0 & 0 & 0 \\ 0 & 0 & 0 & 0 & -1 & 1 & 0 & 0 \\ 0 & 0 & 0 & 0 & 1 & -1 & 1 & 0 \\ 0 & 0 & 0 & 0 & -1 & 1 & -1 & 1 \end{pmatrix},$$

$$X_3 = \begin{pmatrix} 1 & 1 & 0 & 0 & 0 & 0 & 0 & 0 \\ 1 & -1 & 0 & 0 & 0 & 0 & 0 & 0 \\ 0 & 0 & 1 & 0 & 0 & 0 & 0 & 0 \\ 0 & 0 & -1 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix},$$

$$T_8 = \begin{pmatrix} 1 & 0 & 0 & 0 & 0 & 0 & 0 & 0 \\ 0 & 1 & 0 & 0 & 0 & 0 & 0 & 0 \\ 0 & 0 & \sqrt{2} & 0 & 0 & 0 & 0 & 0 \\ 0 & 0 & 0 & 1 & 0 & 0 & 0 & 0 \\ 0 & 0 & 0 & 0 & -2\gamma_2 & 0 & 2\gamma_6 & 0 \\ 0 & 0 & 0 & 0 & 0 & \sqrt{2} & 0 & 0 \\ 0 & 0 & 0 & 0 & -2\gamma_6 & 0 & -2\gamma_2 & 0 \\ 0 & 0 & 0 & 0 & 0 & 0 & 0 & 1 \end{pmatrix},$$

and where $R_8 = Y_2 Y_1$, and wherein $$Y_1 = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 1 & 0 & 0 & 0 & 0 \\ 0 & 0 & 1 & -1 & 0 & 0 & 0 & 0 \\ 0 & 0 & 0 & 0 & 1 & 0 & 0 & 0 \\ 0 & 0 & 1 & 0 & 0 & 1 & 0 & 1 \\ 0 & 0 & 0 & 0 & 0 & 0 & 1 & 0 \\ 0 & 0 & 0 & 0 & 0 & -1 & 0 & 1 \end{pmatrix},$$

$$Y_2 = \begin{pmatrix} 1 & 0 & 0 & 0 & 0 & 0 & 0 & 0 \\ 0 & 0 & 0 & 0 & 0 & 1 & 1 & 0 \\ 0 & 0 & 1 & 0 & 0 & 0 & 0 & 0 \\ 0 & 0 & 0 & 0 & -1 & 0 & 0 & 1 \\ 0 & 1 & 0 & 0 & 0 & 0 & 0 & 0 \\ 0 & 0 & 0 & 0 & 1 & 0 & 0 & 1 \\ 0 & 0 & 0 & 1 & 0 & 0 & 0 & 0 \\ 0 & 0 & 0 & 0 & 0 & 1 & -1 & 0 \end{pmatrix},$$

and $$D_8 = \frac{1}{4} \text{Diag}(\sqrt{2}, \gamma_1, \gamma_2, \gamma_3, \gamma_4, \gamma_5, \gamma_6, \gamma_7).$$

$$A_{12} = D_{12} F_{12}, \qquad (10)$$

-continued where
$F_{12} = R_{12} T_{12} S_{12} P_{12}$,
with
$S_{12} = \Psi_2 K \Psi_1$, $D_{12} = \frac{1}{2}$ Diag $(\alpha_1, \gamma_6, 1/2, \alpha_2\gamma_6, \gamma_4, \gamma_2, \alpha_1, \gamma_6, \alpha_2, \alpha_2\gamma_2, 1/2, -\gamma_2)$, $$R_{12} = \begin{pmatrix} 1 & 0 & 0 & 0 & 0 & 0 & 0 & 0 & 0 & 0 & 0 & 0 \\ 0 & 0 & 0 & 0 & 0 & 0 & 1 & 0 & 0 & 0 & 0 & 1 \\ 0 & 0 & 0 & 0 & 0 & 1 & 0 & 0 & 0 & 1 & 0 & 0 \\ 0 & 0 & 1 & 0 & 0 & 0 & 0 & 0 & 0 & 0 & 0 & 0 \\ 0 & 0 & 0 & 0 & 1 & 0 & 0 & 0 & 0 & 0 & 0 & 0 \\ 0 & 0 & 0 & 0 & 0 & 0 & 0 & 1 & 0 & 0 & 1 & 0 \\ 0 & 1 & 0 & 0 & 0 & 0 & 0 & 0 & 0 & 0 & 0 & 0 \\ 0 & 0 & 0 & 0 & 0 & 0 & 1 & 0 & 0 & 0 & 0 & -1 \\ 1 & 0 & 0 & 0 & 0 & 0 & 0 & 0 & 1 & 0 & 0 & 0 \\ 0 & 0 & 0 & 1 & 0 & 0 & 0 & 0 & 0 & 0 & 0 & 0 \\ 0 & 0 & 0 & 0 & 0 & 1 & 0 & 0 & 0 & 1 & 0 & 0 \\ 0 & 0 & 0 & 0 & 0 & 0 & 0 & 1 & 0 & 0 & -1 & 0 \end{pmatrix}$$

$T_{12} =$ Diag$(1,1,1,1,1,1,1,1,2\alpha_1, \alpha_1\gamma_6/\gamma_2, \alpha_1\gamma_2/\gamma_6,)$, $\Psi_2 = R_3 \times R_1$.
where $$R_3 = \begin{pmatrix} 1 & 1 & 1 \\ 1 & 0 & -1 \\ 1 & -2 & 1 \end{pmatrix},$$

and $$R_4 = \begin{pmatrix} 1 & 0 & 0 & 0 \\ 0 & 1 & 0 & 0 \\ 0 & 0 & 1 & 1 \\ 0 & 0 & 1 & -1 \end{pmatrix},$$

$\Psi_1 = I_3 \times (B_1 B_0)$, where $I_3$ is the 3×3 identity matrix and the matrices $B_1 B_0$ were described above in the earlier factorization for $A_4$, $K = $ Diag$(1,1,1, \gamma_4,1,1,1, \gamma_4,1,1,1, \gamma_4)$,
and $$P_{12} = \begin{pmatrix} 1 & 0 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 1 & 0 & 0 & 0 & 1 & 0 & 0 \\ 0 & 0 & 0 & 0 & 0 & 0 & 0 & 0 & 0 & 0 & 0 & 1 \\ 0 & 0 & 0 & 0 & 0 & 0 & 1 & 0 & 0 & 0 & 0 & 0 \\ 0 & 1 & 0 & 0 & 0 & 0 & 0 & 0 & 0 & 0 & 0 & 0 \\ 0 & 0 & 0 & 0 & 0 & 0 & 0 & 0 & 0 & 1 & 0 \\ 0 & 0 & 0 & 1 & 0 & 0 & 0 & 0 & 0 & 0 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 0 & 1 & 0 & 0 \\ 0 & 0 & 1 & 0 & 0 & 0 & 0 & 0 & 0 & 0 & 0 & 0 \\ 0 & 0 & 0 & 1 & 0 & 0 & 0 & 0 & 0 & 0 & 0 & 0 \end{pmatrix}$$

The application of the factored transform matrix $A_k$ to the two dimensional DCT on k points is implemented by multiplying $F_k$ by $X_k$. The diagonal matrix $D_k$ is absorbed into the quantization step which is further explained below. The factors $F_k$ are referred to as scaled DCT (SDCT) factors on k points. The factors $F_k$ have either no non-trivial multiplications or include one sparse matrix having non-trivial multiplication terms. The above factorization reveals that scaled DCTs on 2 and 3 points require no multiplications. The scaled DCT on 4 points requires a single multiplication by $\gamma_4$ (appearing in $B_2$). The scaled DCT on 6 points requires a single multiplication by $\sqrt{3}$ (appearing in $T_6$). The scaled DCT on 8 points requires five multiplications (in the computation of the product by $T_8$); two by $\sqrt{2}$ and three for the product by the so-called rotator submatrix $$\Gamma_2 = \begin{pmatrix} -2\gamma_2 & 2\gamma_6 \\ -2\gamma_6 & 2\gamma_2 \end{pmatrix}$$

Specifically $\Gamma_2$ has the identity $$\begin{pmatrix} -2\gamma_2 & 2\gamma_6 \\ -2\gamma_6 & 2\gamma_2 \end{pmatrix} \begin{pmatrix} y_1 \\ y_2 \end{pmatrix} = \begin{pmatrix} -1 & 1 & 0 \\ 0 & -1 & -1 \end{pmatrix} \begin{pmatrix} 2(\gamma_2 + \gamma_6)y_0 \\ 2\gamma_6(y_0 + y_1) \\ 2(\gamma_2 - \gamma_6)y_1 \end{pmatrix}$$

The scaled DCT on 12 points requires six multiplications; three for the product by the matrix $S_{12}$ and three for the product by the matrix $T_{12}$.

It will be appreciated that $\sqrt{3}=1.73205$, to nearest five decimal places, and that therefore the approximation $\sqrt{3}=1.75$ is quite accurate. Hence the matrix $T_6$ in the factorization of $F_6$ may be approximated as $_6 = $Diag$(1, 1, 1, 1, 1.75, 1)$, It will also be appreciated that no other multiplications follow the product by 1.75 in the computation of the product by $F_6$, hence errors due to the approximation will not increase unduly. Furthermore, the product by 1.75 can be achieved with two shifts (computations of 2 and 0.25) and a single subtraction (2−0.25). The present invention proposes to make this approximation in the computation of the scaled DCT on 6 points.

Turning next to the matrix $F_8$ of the scaled DCT on 8 points, we observe that $\sqrt{2}=1.41421$ (to five decimal places), and that the factors involving the $\gamma_j$ used in the computation of the rotator product are, to five decimal places, $2(\gamma_2+\gamma_6)=2.61313$, $2\gamma_6=0.76537$, $2(\gamma_2-\gamma_6)=1.08239$. One can make the approximations, $\sqrt{2} \approx 1.5$ $2(\gamma_2 + \gamma_6) \approx 2.5$
$2\gamma_6 \approx .75$
$2(\gamma_2 - \gamma_6) \approx 1.$ Computations of products by these approximates is either trivial (the product by 1) or can be accomplished with a few shifts and additions or subtractions. These approximations may be good enough for image compression applications, especially in the light of the fact that none of the multiplications are nested. The factorization of matrices in the present invention facilitates the use of these approximations because the factorization results in non-nested multiplications. Non-nested multiplications by an approximation result in an error term related to the approximation which is small in comparison with the error term related to the approximation in nested multiplications. If greater accuracy is desired then better approximations can be used, which may require more arithmetic for multiplication. For example, a better approximation would be $2(\gamma_2-\gamma_6) \equiv 1.0625=1+\frac{1}{16}$ which uses more arithmetic the approximation of 1.

Similarly, one can approximate the non-rational factors in the matrix factorization of $F_{12}$, the matrix of the scaled DCT on 12 points, and obtain efficient implementations. However, that some of the multiplications in the factorization of $F_{12}$ are nested, and greater precision in the approximations may have to be made in order to obtain a prescribed output accuracy.

Another embodiment of the present invention, which is particularly useful for image compression applications, computes the the two-dimensional scaled DCT on k×k points and directly multiplies the SDCT on k×k points by X. The matrix of the two-dimensional DCT on k×k points is $$
\begin{aligned}
A_k \otimes A_k &= A_k \otimes A_k \quad (11)\\
&= (D_k F_k) \otimes (D_k F_k)\\
&= (D_k \otimes D_k)(F_k \otimes F_k).
\end{aligned}
$$

The factor $(D_k \otimes D_k)$ is again a diagonal matrix and can be absorbed in the quantization process. As a result, a two-dimensional scaled DCT on k×k points $(F_k \otimes F_k)$ is computed and multiplied by the input data X. As was indicated above for the two-dimensional DCT on k points, one can similarly compute the two-dimensional scaled DCT by using the one-dimensional scaled DCT in row-column fashion, multiplying each row of a k×k input array by $F_k^t$, the transpose of the scaled DCT matrix, and then multiplying each column of the resulting array by $F_k$, the scaled DCT matrix. For a given k×k input array X, the k×k output array $F_k X F_k^t$, has its entries the values of the matrix-vector product $(F_k \otimes F_k)A$, arranged in column-major order, where A is the $k^2$ point vector whose entries are the entries on the array A which are arranged in column-major order. The factorizations for the matrices of the scaled DCTs also lead to factorizations for their transposes because of the matrix identity $(PQ)^t = Q^t P^t$ for all matrices P and Q of approximate dimensions. For example, one has $$A_8^t = F_8^t D_8, \quad (12)$$

with $$F_8^t = S_8^t T_8^t R_8^t$$

$$S_8^t = X_1^t X_2^t X_3^t$$

$$R_8^t = Y_1^t Y_2^t.$$

The process of computing products by the transposes of the matrices appearing in the factorizations above is essentially the same as that of computing the products by the matrices themselves, in that the number of arithmetic operations are identical, their sequences being reversed, and the multiplications themselves being by the same factors. Similarly, computing products by the approximations to the transposes of the matrices appearing in the factorizations above is essentially the same as that of computing the products by the approximations to the matrices themselves, because the approximations of the transposes are simply the transposes of the approximations.

The row-column approach to computing two-dimensional scaled DCTs on k×k points will create nested multiplications, because multiplications involved in the computations of the products of the rows will be followed by multiplications involved in the computations of the products of the columns. Another embodiment of the present invention directly multiplies an SDCT on k×k points by the input data X wherein there are no nested multiplications for the factors $F_4$, $F_6$, $F_8$ and only singly nested multiplications for $F_{12}$ (as opposed to triple nested multiplications in the row-column implementation). As explained above, when non-trivial multiplications are not nested the resulting error associated with approximations to the factors of the non-trivial multiplications do not get large. This is in contrast to the large error terms generated by nested multiplications of even slight approximations to the non-trivial multiplication terms. As a result, the factorization of the present invention allows the use of larger approximations to the non-trivial multiplication factors to remove multiplication operations without sacrificing the accuracy of the final result. This embodiment of the present invention also reduces the overall arithmetic complexity of the computation. In particular, the products by the addition matrices (those whose entries are all 0, 1 or −1) are performed in row-column fashion and the products by the multiplication matrices (those with non-rational entries or their approximations) are performed in a direct method, on columns only.

Two-dimensional scaled DCTs on 2×2 and 3×3 points involve no multiplications, so these are done in row-column fashion. For the two-dimensional scaled DCT on 6×6 points, one has its corresponding matrix representation $$
\begin{aligned}
F_6 \otimes F_6 &= (R_6 T_6 S_6 P_6) \otimes (R_6 T_6 S_6 P_6)\\
&= (R_6 \otimes R_6)(T_6 \otimes T_6)(S_6 \otimes S_6)(P_6 \otimes P_6).
\end{aligned}
$$

The products by the addition matrices $(R_6 \otimes R_6)$ and $(S_6 \otimes S_6)$ are computed in row-column fashion. The matrix $(P_6 \otimes P_6)$ is a permutation matrix, and its product involves no arithmetic. The product by the multiplication matrix $(T_6 \otimes T_6)$ of a 36-point vector whose entries are those of a 6×6 array arranged in column-major order, is done as follows. Columns 1, 2, 3, 4 and 6 of the array are multiplied by $T_6$, and column 5 is multiplied by $\sqrt{3}\, T_6$. The multiplication stage can be approximated as follows. Columns 1, 2, 3, 4 and 6 of the array are multiplied by $\underline{T}_6$ (which was described above), and column 5 is multiplied by $\overline{T}_6$, where $$\overline{T}_6 = \text{Diag}(1.75, 1.75, 1.75, 1.75, 3, 1.75).$$

For the two-dimensional scaled DCT on 8×8 points, one has $$
\begin{aligned}
F_8 \otimes F_8 &= (R_8 T_8 S_8) \otimes (R_8 T_8 S_8)\\
&= (R_8 \otimes R_8)(T_8 \otimes T_8)(S_8 \otimes S_8)
\end{aligned}
$$

with $$
\begin{aligned}
S_8 \otimes S_8 &= (X_3 X_2 X_1) \otimes (X_3 X_2 X_1)\\
&= (X_3 \otimes X_3)(X_2 \otimes X_2)(X_1 \otimes X_1).
\end{aligned}
$$

All factors above are addition matrices except for the multiplication matrix $(T_8 \otimes T_8)$. An 8×8 array is transformed by this multiplication matrix as follows: the first, second, fourth and eighth columns of the array are each multiplied by $T_8$. The third and sixth columns of the array are each multiplied by $\sqrt{2}\, T_8$. The fifth and seventh columns will be handled simultaneously. A 16-dimensional column vector is formed by interleaving the entries of these two columns. The first, second, fourth and eighth pairs of entries are each multiplied by the rotator matrix $\Gamma_2$; while the third and sixth pairs are multiplied by a second rotator matrix $\sqrt{2}\, \Gamma_2$; and the fifth and seventh pairs of entries are multiplied simultaneously by $\Gamma_2 \otimes \Gamma_2$. Efficient multiplication by $\Gamma_2$ was discussed above. Multiplication by $\sqrt{2}\, \Gamma_2$ is done via the formula $$\sqrt{2}\, \Gamma_2 \begin{pmatrix} y_1 \\ y_2 \end{pmatrix} = \begin{pmatrix} -1 & 1 & 0 \\ 0 & -1 & -1 \end{pmatrix} \begin{pmatrix} 2\sqrt{2}\,(\gamma_2 + \gamma_6) y_0 \\ 2\sqrt{2}\,\gamma_6(y_0 + y_1) \\ 2\sqrt{2}\,(\gamma_2 - \gamma_6) y_1 \end{pmatrix}.$$

Multiplication by $\Gamma_2 \otimes \Gamma_2$ is done via the formula $$\Gamma_2 \otimes \Gamma_2 = \begin{pmatrix} 1 & 0 & 1 & 0 \\ 0 & 1 & 0 & 1 \\ 0 & 1 & 0 & -1 \\ -1 & 0 & 1 & 0 \end{pmatrix} \begin{pmatrix} \sqrt{2} & \sqrt{2} & 0 & 0 \\ \sqrt{2} & -\sqrt{2} & 0 & 0 \\ 0 & 0 & 2 & 0 \\ 0 & 0 & 0 & 2 \end{pmatrix} \begin{pmatrix} 1 & 0 & 0 & -1 \\ 0 & 1 & 1 & 0 \\ 1 & 0 & 0 & 1 \\ 0 & 1 & -1 & 0 \end{pmatrix}.$$

From this factorization, the computation of the product of a 4 dimensional column vector by $\Gamma_2 \otimes \Gamma_2$ is accomplished with 2 multiplications, 10 additions/subtractions, and 2 shifts. The above explanation illustrates that none of the multiplications in the above method for the two-dimensional scaled DCT on 8×8 points are nested. Additionally, further modifications to the process can be made by substituting appropriate approximations for the non-rational factors in the multiplication steps.

For the two-dimensional scaled DCT on 12×12 points, one has $$\begin{aligned} F_{12} \otimes F_{12} &= (R_{12}T_{12}S_{12}P_{12}) \otimes (R_{12}T_{12}S_{12}P_{12}) \\ &= (R_{12} \otimes R_{12})(T_{12} \otimes T_{12})(S_{12} \otimes S_{12})(P_{12} \otimes P_{12}). \end{aligned}$$

Also, $$\begin{aligned} S_{12} \otimes S_{12} &= (\Psi_2 K_{12} \Psi_1) \otimes (\Psi_2 K_{12} \Psi_1) \\ &= (\Psi_2 \otimes \Psi_2)(K \otimes K)(\Psi_1 \otimes \Psi_1). \end{aligned}$$

the multiplications all occur in the computations of the products by $T_{12} \otimes T_{12}$ and $K \otimes K$. The product by $T_{12} \otimes T_{12}$ of a 144-point vector whose entries are from a 12×12 array arranged in column-major form is done as follows. The first nine columns of the array are each multiplied by $T_{12}$; the tenth column is multiplied by $2\gamma_1 T_{12}$; the eleventh column is multiplied by $2(\gamma_6/\gamma_2)T_{12}$; the twelfth column is multiplied by $2(\gamma_2/\gamma_6)T_{12}$. The product by $K \otimes K$ of a 144-point vector whose entries are from a 12×12 array arranged in column-major form is done as follows. All but the fourth, eighth and twelfth columns are each multiplied by $K$; the fourth, eighth and twelfth columns are each multiplied by $(\sqrt{2}/2)K$. It will be appreciated that all the multiplications in the above method for the two-dimensional scaled DCT on 12×12 points are at most singly nested. Again, substitution of appropriate approximations for the non-rational factors in the multiplication steps are also useful.

After either the SDCT or the approximate SDCT data has been generated and multiplied by the input data, FIG. 2 illustrates that this data is quantized through the quantization step 235. For notational convenience we will call both SDCT output data and approximate SDCT output data simply SDCT output data. The quantization process is a two step procedure in which the SDCT output data is pointwise multiplied then rounded to the nearest integer. The multiplication step involves multiplying each of the M×N SDCT output data values for each of the three Y, U, and V matrices by a constant which is usually predetermined experimentally once and for all and accounts for the characteristics of the human visual system. The constants may be different for each element in the Y, U, and V matrices. In the standard DCT compression scheme, each of the k×k blocks in each of the Y, U, V matrices is transformed via the DCT, and after transformation, is multiplied pointwise by the reciprocal of a predetermined quantity $\eta_{ij}, 0 \leq (i,j) \leq k-1$. The k×k matrix ($\eta_{ij}$) is often called the quantization matrix. This matrix may vary for each of the various color planes Y, U and Y. The generation of quantization matrices is a known art. Specifically, if the block output of the DCT is $\hat{x}_{ij}$, then the block output after quantization is $b_{ij} = \hat{x}_{ij}/\eta_{ij}$. The present invention utilizes scaled-DCTs, and absorbs the diagonal matrix $D_k$ into the quantization process. A new k×k quantization matrix whose entries are $\bar{\eta}_{ij} = \eta_{ij}/d_{ij}$ is substituted for the standard quantization matrix ($\eta_{ij}$), wherein $d_{ij}$ is the (jk+i)-th entry of the diagonal matrix $D_k \otimes D_k$. The output $\bar{x}_{ij}$ of the scaled-DCT is pointwise multiplied by the reciprocals of the entries from this new quantization matrix, yielding $\bar{b}_{ij} = \bar{x}_{ij}/\bar{\eta}_{ij}$. The quantities $b_{ij}$ (output using standard DCTs and quantization matrices) and $\bar{b}_{ij}$ (output using SDCTs and new quantization matrices) can be made arbitrarily close by computing with sufficiently high precision. Digital multipliers which have a sufficient number of bits (approximately two times the number of bit of the highest accuracy multiplicand) to maintain the accuracy associated with the multiplicands are used.

Figure 3:
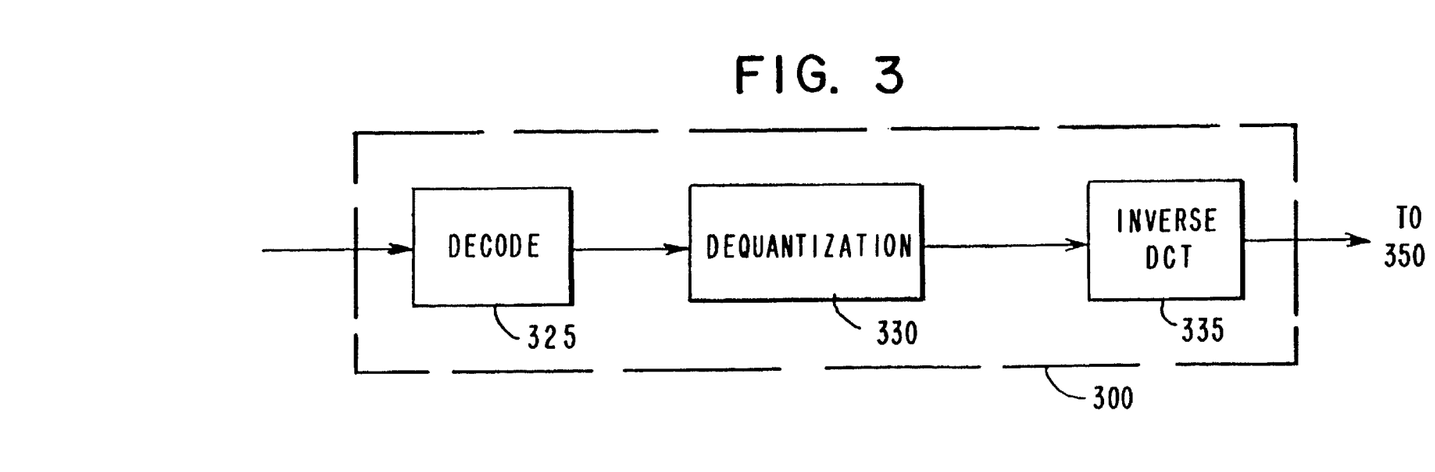
FIG. 3 illustrates a second embodiment of a data conversion means according to the present invention.

Once the SDCT output data has been quantized, FIG. 2 illustrates that the data is coded by a data coding process 240 such as Huffman coding. Huffman coding is implemented in a look-up table which substitutes variable length code words for fixed length words of input data. Coding means 240 can also comprise a variety of digital implementations of coding processes, such as ALUs, dedicated multipliers or shift and add units, or other special purpose devices for manipulating digital data. After the quantized data is coded, it is converted into digital signals, and then transmitted over the data channel 250 by data drivers. The data channel medium may be electrical, optical, or electromagnetic, and as a result, conversion devices which translate individual data bits into signal pulses (and vice versa) may be electrical, electro-optic, or electromagnetic devices. Similarly, data drivers (or transmitters) and data sensors (or receivers) may be electrical, optical, or electromagnetic devices. FIG. 1 illustrates that after transmission, the processor 275 receives the transmitted data and the data conversion means 300 decodes, dequantizes, and applies an inverse scaled-DCT process to the transmitted data. FIG. 3 illustrates that the transmitted data is initially decoded through an inverse coding procedure 325, such as an inverse Huffman coding procedure. Once the data is decoded, it must be dequantized 330 and have the inverse scaled-DCT operation 335 performed on it in order to generate YUV form data. Once the YUV form data is generated, the inverse RGB conversion can take place to generate RGB form data for display on a monitor.

The data conversion means 300 of FIG. 1 is the complementary means to the data conversion means 200. For example, if a Huffman coding method is used in coding process 240, then a Huffman de-coding means is used in de-code process 325. The decode means 325 of FIG. 3 is implements a Huffman de-coding procedure in look-up tables or other similar devices for manipulating digital data. The output of the decoding process is three M×N matrices of quantized, scaled-DCT data. The data conversion means 300 also includes the dequantization 330 and inverse-scaled DCT (ISDCT) transformation 335 processes. The dequantization step 330 is only a multiplication step as opposed to a multiplication and truncation step as in the quantization process. This is because once data has been truncated, then the truncated part of the data is lost and it cannot be retrieved. The multiplication step in the dequantization process multiplies each of the elements in the three M×N matrices of decoded data by a predetermined constant which reverses the quantization process. In the standard DCT decompression scheme, each of the k×k blocks in each of the $\Gamma_y$, $\Gamma_u$, $\Gamma_v$ matrices is multiplied pointwise by the quantity $\eta_{ij}, 0 \leq (i,j) \leq k-1$ which appears as an entry in the quantization matrix. If one block of decoded, quantized DCT data is $b_{ij}$, then the block output after dequantization is $z_{ij}=b_{ij}\eta_{ij}$.

The present invention utilizes inverse scaled-DCTs, and absorbs the diagonal matrix $D_k$ into the dequantization process. The inverse scaled DCT (ISDCTs) are generated from the scaled DCTs (SDCTs) by a SDCT inversion procedure based either on inversion via transposition or via direct inversion, as will be discussed below. In the embodiment where SDCT inversion is performed via transposition, a new k×k dequantization matrix whose entries are $\bar{\eta}_{ij}=\eta_{ij}d_{ij}$ is substituted for the standard dequantization matrix $\eta_{ij}$ wherein $d_{ij}$ is the (jk+i)-th entry of the diagonal matrix $D_k \otimes D_k$. The block entry values $\bar{b}_{ij}$ are multiplied pointwise by entries from this new dequantization matrix, yielding $\bar{z}_{ij}=\bar{b}_{ij}\bar{\eta}_{ij}$. In the embodiment where inversion is performed via direct inversion, as was suggested above and by equation (15), a k×k dequantization matrix whose entries are $\hat{\eta}_{ij}=\eta_{ij}/d_{ij}$ is substituted for the standard dequantization matrix $\eta_{ij}$ wherein $d_{ij}$ is the (jk+i)-th entry of the diagonal matrix $D_k \otimes D_k$. The block entry values $\bar{b}_{ij}$ are multiplied pointwise by entries from this new dequantization matrix, yielding $\bar{z}_{ij}=\bar{b}_{ij}\hat{\eta}_{ij}$. Under both methods, the output of the standard dequantization process $z_{ij}$ can be made arbitrarily close to the output of the dequantization procedure according to the present invention $\bar{z}_{ij}$ by computing with sufficiently high precision. Digital multipliers which have a sufficient number of bits (approximately two times the number of bit of the highest accuracy multiplicand) are used to maintain the accuracy associated with the multiplicands are used. In the second method corresponding to direct inversion, the resulting dequantization matrix is identical to the quantization matrix used in the forward conversion procedure. Also, the quantization coefficients can be chosen so that $\hat{\eta}_{ij}$ are all simple sums and differences of powers of 2, so that multiplication by any $\hat{\eta}_{ij}$ can be accomplished with shifts, additions and subtractions only.

After the dequantization process 330, an ISDCT process 335 is applied to the resulting data. In the present embodiment, implementation of the ISDCT is done via the transposition method. The factorization of the inverse scaled-transform matrix is very similar to the forward SDCT transform because the DCT matrix is orthogonal which means its inverse is its transpose. Thus $$A_k^{-1} = A_k^t (D_k F_k)^t = F_k^t D_k^t. \tag{13}$$

The inverse scaled DCT corresponds to the matrix $F_k^t$. That means that to obtain the inverse transform matrix, the individual factors need only be rearranged rather than recomputed. This was already illustrated above for the case k=8 in equation (12) and the ensuing paragraph. For the two-dimensional case, the factorization is obtained via the identity $$(A_k \otimes A_k)^{-1} = A_k^t \otimes A_k^t = (F_k^t \otimes F_k^t)(D_k^t \otimes D_k^t). \tag{14}$$

The matrix $D_k^t \otimes D_k^t$ is diagonal and is absorbed in the dequantization. The matrix $F_k^t \otimes F_k^t$ corresponds to a two-dimensional inverse scaled-DCT.

Alternately, direct inversion may be used to generate the factorization for the inverse scaled DCT. Specifically, one has $$A_k^{-1} = (D_k F_k)^{-1} = F_k^{-1} D_k^{-1} \tag{15}$$

and $$(A_k \otimes A_k)^{-1} = A_k^{-1} \otimes A_k^{-1} = (F_k^{-1} \otimes F_k^{-1})(D_k^{-1} \otimes D_k^{-1}). \tag{16}$$

The matrix $D_k^{-1} \otimes D_k^{-1}$ is diagonal and is absorbed in the dequantization process.
The matrix $F_k^{-1} \otimes F_k^{-1}$ corresponds to a two-dimensional inverse scaled-DCT.

One may modify the inverses of the addition matrices so that they also become addition matrices. For example, in the case k=4, $$\begin{aligned} A_4^{-1} &= (D_4 B_3 B_2 B_1 B_0)^{-1} \\ &= B_0^{-1} B_1^{-1} B_2^{-1} B_3^{-1} D_4^{-1}, \end{aligned} \tag{17}$$

with $B_0^{-1} = (\frac{1}{2})B_0$, and $$B_1^{-1} = \begin{pmatrix} .5 & .5 & 0 & 0 \\ .5 & -.5 & 0 & 0 \\ 0 & 0 & 1 & -1 \\ 0 & 0 & 0 & 1 \end{pmatrix},$$

$$B_2^{-1} = \begin{pmatrix} 1 & 0 & 0 & 0 \\ 0 & 1 & 0 & 0 \\ 0 & 0 & 1 & 0 \\ 0 & 0 & 0 & \sqrt{2} \end{pmatrix},$$

$$B_3^{-1} = \begin{pmatrix} 1 & 0 & 0 & 0 \\ 0 & 0 & .5 & .5 \\ 0 & 1 & 0 & 0 \\ 0 & 0 & .5 & -.5 \end{pmatrix}.$$

After modification of the entries in the addition matrices, one can convert the above factorization to $$A_4^{-1} = \tilde{B}_0 \tilde{B}_1 \tilde{B}_2 \tilde{B}_3 D_4^{-1}, \tag{18}$$

with $\tilde{B}_0 = B_0$, and $$\tilde{B}_1 = \begin{pmatrix} 1 & 1 & 0 & 0 \\ 1 & -1 & 0 & 0 \\ 0 & 0 & 1 & -1 \\ 0 & 0 & 0 & 1 \end{pmatrix},$$

$$\tilde{B}_2 = \frac{1}{4}\begin{pmatrix} 1 & 0 & 0 & 0 \\ 0 & 1 & 0 & 0 \\ 0 & 0 & 1 & 0 \\ 0 & 0 & 0 & \sqrt{2} \end{pmatrix},$$

$$\tilde{B} = \begin{pmatrix} 1 & 0 & 0 & 0 \\ 0 & 0 & 1 & 1 \\ 0 & 1 & 0 & 0 \\ 0 & 0 & 1 & -1 \end{pmatrix}.$$

Similar modifications are appropriate for the cases k=6, 8, 12. Once these new forms of inverse DCTs and inverse scaled-DCTs have been obtained, new forms for forward DCTs and scaled-DCTs can be obtained by transposition of the new inverse forms. Approximations to the non-rational factors in the multiplications arising from these factorizations may be substituted, and the resulting multiplication processes will enjoy all the accuracy and efficiency properties as described above.

The resulting ISDCT outputs represent three matrices having Y', U', and V' data. The Y'U'V' matrices are not exactly identical to the YUV data at the encoder side of the process because of the quantization losses, but they are approximately identical. Once the Y'U'V' data has been generated, it is sent to transform means 350 for conversion to R'G'B' data. Specifically, the transform means converts Y'U'V' data to R'G'B' data according to the following function: R'=Y'–V' and G'=Y'+0.194 G+0.509 B' and B'=Y'–U'. data. The R'G'B' matrices are not exactly identical to the RGB data which began the process because of the quantization losses, but they are approximately identical.

Figure 4:
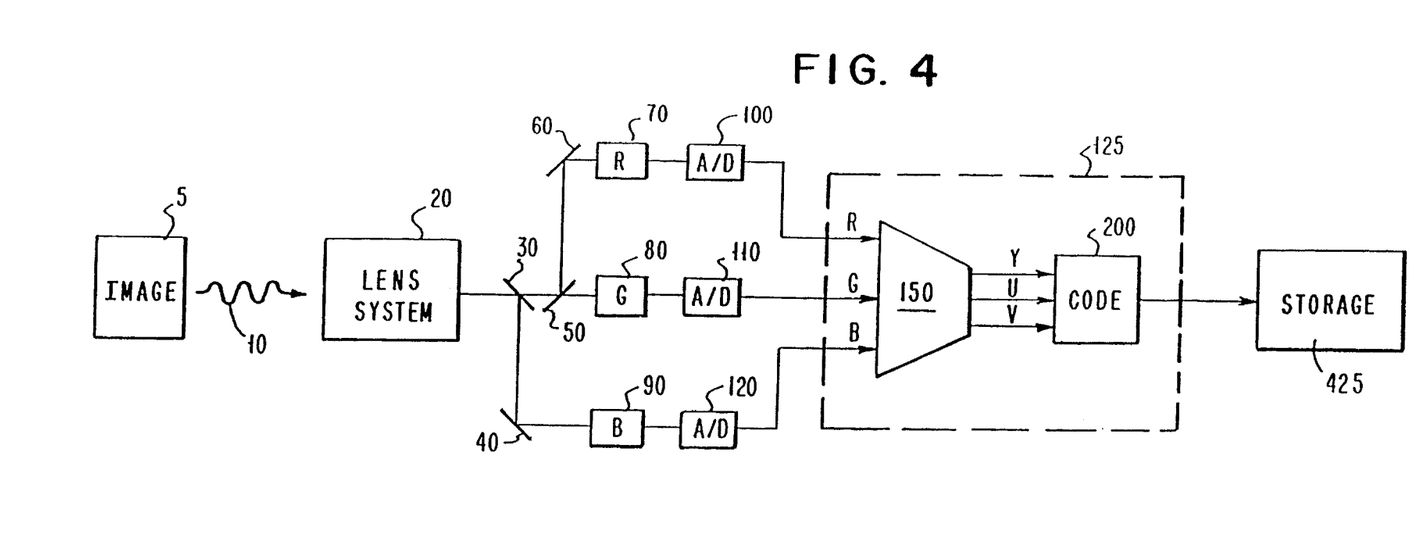
FIG. 4 illustrates another embodiment of a digital image processing system according to the present invention.
Figure 5:
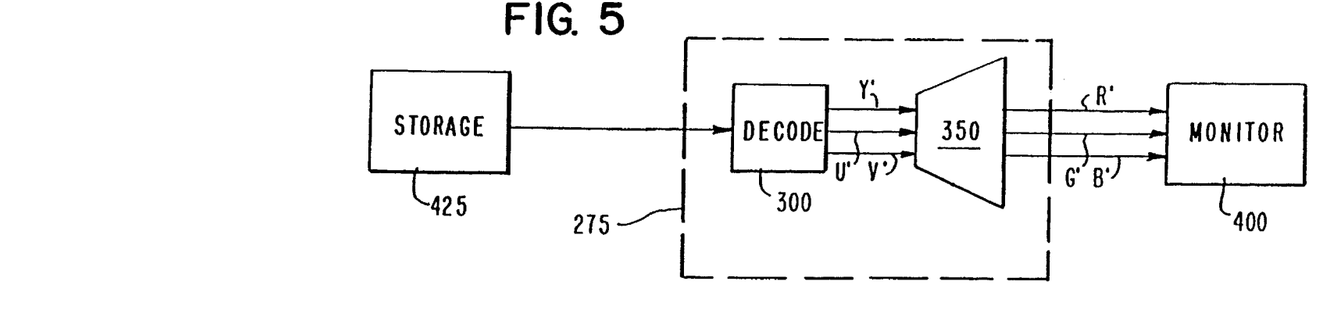
FIG. 5 illustrates a further embodiment of a digital image processing system according to the present invention.

The forward SDCT process described here can be used with conventional inverse DCT techniques to yield images visually identical to those processed with conventional forward DCT techniques. Similarly, the inverse SDCT conversion described here can be used with conventional forward DCT techniques to yield images visually identical to those processed with conventional inverse color conversion. This means that the forward DCT techniques used to implement particular transformations are separate from the techniques used to implement inverse transformations. FIG. 4 illustrates another embodiment of an image processing system according to the present invention. FIG. 4 illustrates that coded data from code means 200 can be stored in storage means 425 to be used separately by other image processing systems having decoding and inverse DCT conversion means which are different from that described here. Similarly, FIG. 5 illustrates a further embodiment of an image processing system according to the present invention. FIG. 5 illustrates that DCT data stored in storage means 425, can be decoded and converted via the techniques of the present invention for display on a monitor even though the stored data did not take advantage of the forward SDCT conversion processes described in this invention. Storage means 425 in either the embodiment for storing images or displaying images according to this invention can be conventional electrical, optical, or electromagnetic storage means for storing digital data.

While the invention has been described and illustrated with respect to plural embodiments thereof, it will be understood by those skilled in the art that various changes in the detail may be made therein without departing from the spirit, scope, and teaching of the invention. Therefore, the invention disclosed herein is to be limited only as specified in the following claims.

We claim:

1. A method for transmitting an image over a data channel, comprising:

converting signals representing an image into RGB form data;

transforming said RGB form data into YUV data;

converting said YUV data into DCT data by multiplying a factored transform matrix $F_k$ to a plurality of subsets of said YUV data having k points wherein:

$$A_k = D_k F_k;$$

$A_k$ is a transform matrix converting subsets of YUV data into DCT data; and $D_k$ is a k×k diagonal matrix;

absorbing $D_k$ into a matrix having elements $\eta_{ij}$ to form a quantization matrix having elements $\hat{\eta}_{ij}$;

quantizing said DCT data with said quantization matrix;

converting said quantized DCT data into signals for transmission over said data channel; and applying said signals to said data channel.

2. A method for transmitting an image over a data channel, as in claim 1, wherein:

$D_k$ is the k×k diagonal matrix in which the jj-th element is the first entry in the j-th row of $A_k$.

3. A method for transmitting an image over a data channel, as in claim 1, wherein:

a (jk+i)-th element of $D_k \otimes D_k$ is absorbed to form said quantization matrix, wherein $\otimes$ is tensor multiplication.

4. A method for transmitting an image over a data channel, as in claim 3, wherein:

non rational elements of $F_k$ are approximated by rational elements.

5. A method for transmitting an image over a data channel, as in claim 4, wherein:

a function of multiplying by a rational number is implemented by shift and add operations.

6. A method for transmitting an image over a data channel, comprising:

converting signals representing an image into RGB form data;

transforming said RGB form data into YUV data;

converting said YUV data into DCT data by multiplying a factored transform matrix $F_k \otimes F_k$ by a plurality of subsets of said YUV data having $k^2$ points wherein:

$$A_k \otimes A_k = (D_k \otimes D_k)(F_k \otimes F_k);$$

$A_k \otimes A_k$ is a transform matrix for converting subsets of YUV data into DCT data; and $D_k \otimes D_k$ is a $k^2 \times k^2$ diagonal matrix;

absorbing $D_k \otimes D_k$ into a matrix having elements $\eta_{ij}$ to form a quantization matrix having elements $\hat{\eta}_{ij}$;

quantizing said DCT data with said quantization matrix;

converting said quantized DCT data into signals for transmission over said data channel; and applying said signals to said data channel.

7. A method for transmitting an image over a data channel, as in claim 6, wherein:

$D_k \otimes D_k$ is the $k^2 \times k^2$ diagonal matrix in which the jj-th element is the first entry in the j-th row of $A_k \otimes A_k$.

8. A method for transmitting an image over a data channel, as in claim 6, wherein:

a (jk+i)-th element of $D_k \otimes D_k$ is absorbed to form said quantization matrix.

9. A method for transmitting an image over a data channel, as in claim 8, wherein:

non-rational elements of $F_k \otimes F_k$ are approximated by rational elements.

10. A method for transmitting an image over a data channel, as in claim 9, wherein:

a function of multiplying by a rational number is implemented by shift and add operations.

11. A method for generating an image, comprising:

sensing signals representing said image from a data channel;

decoding said sensed signals into DCT form data;

absorbing a diagonal matrix $D_k$ into a matrix having elements $\eta_{ij}$ to form a dequantization matrix having elements $\hat{\eta}_{ij}$;

dequantizing said DCT form data with said dequantization matrix;

converting said DCT data into YUV data by multiplying a plurality of subsets of said DCT data having k points by a factored transform matrix $F_k^t$, wherein:

$$A_k^{-1} = F_k^t D_k;$$

$A_k^{-1}$ is a transform matrix for converting subsets of DCT data into YUV data; and $D_k$ is a k×k diagonal matrix;

converting said YUV data into RGB form data; and applying said RGB form data to a display to generate said image.

12. A method for generating an image, as in claim 11, wherein:

$D_k$ is the k×k diagonal matrix in which the jj-th element is an inverse of a first entry in a j-th row of $A_k^{-1}$.

13. A method for generating an image, as in claim 11, wherein:

a (jk+i)-th element of $D_k \otimes D_k$ is absorbed to form said dequantization matrix, wherein $\otimes$ is tensor multiplication.

14. A method for generating an image, as in claim 13, wherein:

non-rational elements of $F_k^t$ are approximated by rational elements.

15. A method for generating an image, as in claim 14, wherein:

a function of multiplying by a rational number is implemented by shift and add operations.

16. A method for generating an image, comprising:

sensing signals representing said image from a data channel;

decoding said sensed signals into DCT form data;

absorbing a diagonal matrix $D_k^{-1}$ into a matrix having elements $\eta_{ij}$ to form a dequantization matrix having elements $\eta_{ij}'$;

dequantizing said DCT form data with said dequantization matrix;

converting said DCT data into YUV data by multiplying a plurality of subsets of said DCT data having k points by a factored transform matrix $F_k^t$ wherein:

$$A_k^{-1} = F_k^{-1} D_k^{-1};$$

$A_k^{-1}$ is a transform matrix for converting subsets of DCT data into YUV data; and $D_k^{-1}$ is a k×k diagonal matrix;

converting said YUV data into RGB form data; and applying said RGB data to a display to generate said image.

17. A method for generating an image, as in claim 16, wherein:

$D_k^{-1}$ is the k×k diagonal matrix in which the jj-th element is an inverse of a first entry in a j-th row of $A_k^{-1}$.

18. A method for generating an image, as in claim 16, wherein:

a (jk+i)-th element of $D_k^{-1} \otimes D_k^{-1}$ is absorbed to form said dequantization matrix, wherein $\otimes$ is tensor multiplication.

19. A method for generating an image, as in claim 18, wherein:

non-rational elements of $F_k^{-1}$ are approximated by rational elements.

20. A method for generating an image, as in claim 19, wherein:

a function of multiplying by a rational number is implemented by shift and add operations.

21. A method for generating an image, comprising:

sensing signals representing said image from a data channel;

decoding said sensed signals into DCT form data;

absorbing a diagonal matrix $D_k$ into a matrix having elements $\eta_{ij}$ to form a dequantization matrix having elements $\eta_{ij}'$;

dequantizing said DCT form data with said dequantization matrix;

converting said DCT data into YUV data by multiplying a plurality of subsets of said DCT data having $k^2$ points by a factored transform matrix $F_k^t \otimes F_k^t$, wherein:

$$A_k^{-1} \otimes A_k^{-1} = (F_k^t \otimes F_k^t)(D_k \otimes D_k);$$

$A_k^{-1} \otimes A_k^{-1}$ is a transform matrix for converting subsets of DCT data into YUV data; and $D_k \otimes D_k$ is a $k^2 \times k^2$ diagonal matrix;

converting said YUV data into RGB form data; and applying said RGB form data to a display to generate said image.

22. A method for generating an image, as in claim 21, wherein:

$D_k \otimes D_k$ is the $k^2 \times k^2$ diagonal matrix in which the jj-th element is an inverse of a first entry in a j-th row of $A_k^{-1} \otimes A_k^{-1}$–k.

23. A method for generating an image, as in claim 21, wherein:

a (jk+i)-th element of $D_k \otimes D_k$ is absorbed to form said dequantization matrix.

24. A method for generating an image, as in claim 23, wherein:

non-rational elements of $F_k^t \otimes F_k^t$ are approximated by rational elements.

25. A method for generating an image, as in claim 24, wherein:

a function of multiplying by a rational number is implemented by shift and add operations.

26. A method for generating an image, comprising:

sensing signals representing said image from a data channel;

decoding said sensed signals into DCT form data;

absorbing a diagonal matrix $D_k^{-1}$ into a matrix having elements $\eta_{ij}$ to form a dequantization matrix having elements $\eta_{ij}'$;

dequantizing said DCT form data with said dequantization matrix;

converting said DCT data into YUV data by multiplying a plurality of subsets of said DCT data having $k^2$ points by a factored transform matrix $F_k^{-1} \otimes F_k^{-1}$ wherein:

$$A_k^{-1} \otimes A_k^{-1} = (F_k^{-1} \otimes F_k^{-1})(D_k^{-1} \otimes D_k^{-1});$$

$A_k^{-1} \otimes A_k^{-1}$ is a transform matrix for converting subsets of DCT data into YUV data; and $D_k^{-1} \otimes D_k^{-1}$ is a $k^2 \times k^2$ diagonal matrix;

converting said YUV data into RGB form data; and applying said RGB data to a display to generate said image.

27. A method for generating an image, as in claim 26, wherein:

$D_k^{-1} \otimes D_k^{-1}$ is the $k^2 \times k^2$ diagonal matrix in which the jj-th element is an inverse of a first entry in a j-th row of $A_k^{-1} \otimes A_k^{-1}$.

28. A method for generating an image, as in claim 26, wherein:

a (jk+i)-th element of $D_k^{-1} \otimes D_k^{-1}$ is absorbed to form said dequantization matrix.

29. A method for generating an image, as in claim 28, wherein:

non-rational elements of $F_k^{-1} \otimes F_k^{-1}$ are approximated by rational elements.

30. A method for generating an image, as in claim 29, wherein:

a function of multiplying by a rational number is implemented by shift and add operations.

31. An image transmitter, comprising:

an RGB data generator for representing an image with RGB form data;

an RGB to YUV transformer coupled to said RGB data generator for converting said RGB form data into YUV form data;

a YUV to DCT transformer coupled to said RGB to YUV transformer for converting said YUV data into DCT form data by multiplying a factored transform matrix $F_k$ by a plurality of subsets of said YUV data having k points wherein:

$$A_k = D_k F_k;$$

$A_k$ is a transform matrix for converting subsets of YUV data into DCT data; and $D_k$ is a k×k diagonal matrix;

a quantization means coupled to said YUV to DCT transformer for quantizing said DCT data with a quantization matrix having elements $\hat{\eta}_{ij}$ and generated by absorbing $D_k$ into a matrix having elements $\eta_{ij}$; and a driver means coupled to said quantization means and a data channel for converting said quantized DCT data into signals for transmission over said data channel and applying said signals to said data channel.

32. A image receiver, comprising:

a sensor for sensing coded data from a data channel;

a decoder coupled to said sensor for decoding data sensed from said data channel into DCT form data;

a dequantizer coupled to said decoder for quantizing said DCT form data from said decoder with a dequantization matrix, said dequantization matrix formed by absorbing a diagonal matrix $D_k$ into a matrix having elements $\eta_{ij}$ to form said dequantization matrix having element $\hat{\eta}_{ij}$;

a DCT to YUV transformer coupled to said dequantizer for converting dequantized DCT data from said dequantizer into YUV form data by multiplying a factored transform matrix $F_k^t$ by a plurality of subsets of said dequantized DCT data having k points wherein:

$$A_k^{-1} = D_k F_k^t;$$

$A_k^{-1}$ is a transform matrix for converting subsets of DCT data into YUV data; and $D_k$ is a k×k diagonal matrix;

a YUV to RGB transformer coupled to said DCT to YUV transformer for conveying YUV data from said DCT to YUV transformer into RGB form data; and a driver for applying said RGB form data to a display to generate said image.

* * * * *